United States Patent
Lu et al.

(10) Patent No.: US 11,854,302 B2
(45) Date of Patent: Dec. 26, 2023

(54) SYSTEM AND METHOD FOR CALIBRATING A THREE-DIMENSIONAL SCANNING DEVICE

(71) Applicant: Himax Technologies Limited, Tainan (TW)

(72) Inventors: Hsueh-Tsung Lu, Tainan (TW); Ching-Wen Wang, Tainan (TW); Cheng-Che Tsai, Tainan (TW); Wu-Feng Chen, Tainan (TW)

(73) Assignee: Himax Technologies Limited, Tainan (TW)

( * ) Notice: Subject to any disclaimer, the term of this patent is extended or adjusted under 35 U.S.C. 154(b) by 239 days.

(21) Appl. No.: 17/487,972

(22) Filed: Sep. 28, 2021

(65) Prior Publication Data
US 2023/0126591 A1    Apr. 27, 2023

(51) Int. Cl.
*G06V 40/16* (2022.01)
*G06T 17/00* (2006.01)
*G06V 20/64* (2022.01)

(52) U.S. Cl.
CPC ............ *G06V 40/161* (2022.01); *G06T 17/00* (2013.01); *G06V 20/653* (2022.01); *G06V 40/172* (2022.01)

(58) Field of Classification Search
CPC .......... G06T 17/00; G06T 7/00; G06V 10/14; G06V 20/653; G06V 40/161; G06V 40/172
See application file for complete search history.

(56) References Cited

U.S. PATENT DOCUMENTS

| 2017/0294009 A1* | 10/2017 | Pollard ................. G06T 7/80 |
| 2020/0184684 A1* | 6/2020 | Ma ....................... G06T 7/174 |
| 2020/0319322 A1* | 10/2020 | Fenton ................ G01S 7/497 |

OTHER PUBLICATIONS

Zhang et al, "Novel method for structured light system Calibration", Optical Engineering 45 (8), 2006 (Year: 2006).*

\* cited by examiner

*Primary Examiner* — Ruiping Li
(74) *Attorney, Agent, or Firm* — Donald E. Stout; Stout, Uxa & Buyan, LLP

(57) ABSTRACT

A system for calibrating a three-dimensional scanning device includes a structured-light scanner capable of performing a structured-light operation, and a processor that performs calibration on a device under calibration (DUC). The structured-light scanner captures a base image by performing the structured-light operation prior to calibration. The structured-light scanner captures a calibration image with respect to corresponding DUC during calibration, and the calibration image is inputted to the processor, which determines transformation mapping from the calibration image to the base image. The determined transformation is then transferred to the DUC during calibration.

15 Claims, 3 Drawing Sheets

SYSTEM AND METHOD FOR CALIBRATING A THREE-DIMENSIONAL SCANNING DEVICE

BACKGROUND OF THE INVENTION

1. Field of the Invention

The present invention generally relates to a three-dimensional (3D) scanning device, and more particularly to a system and method for calibrating a structured-light scanner.

2. Description of Related Art

Face detection, a specific case of object detection, is a computer technology used in a variety of applications (for example, mobile phones) to identify human faces in an image.

As conventional face detection techniques may be deceived, for example, by a two-dimensional (2D) picture containing the face to be detected, a three-dimensional (3D) scanning device is thus proposed to detect the face of a live person. A structured-light scanner is one of 3D scanning devices for measuring the 3D shape of an object using projected light patterns and a camera system.

The structured-light scanner inevitably suffers geometric distortions by optics and, in particular, assembly error, which should be compensated by calibration using special calibration patterns and surfaces. However, conventional calibration process for the structured-light scanner requires substantive processing time (for storing a calibration image or ground truth) and thus incurs high cost. This issue becomes worse when demand for high image quality or high resolution sensing arises.

A need has thus arisen to propose a novel calibration scheme to overcome drawbacks of the conventional calibration process for the structured-light scanner.

SUMMARY OF THE INVENTION

In view of the foregoing, it is an object of the embodiment of the present invention to provide a system and method for calibrating a three-dimensional (3D) scanning device with substantially reduced time and cost during calibration.

According to one embodiment, a system for calibrating a three-dimensional scanning device includes a structured-light scanner and a processor. The structured-light scanner is capable of performing a structured-light operation. The processor performs calibration on a device under calibration (DUC). The structured-light scanner captures a base image by performing the structured-light operation prior to calibration. The structured-light scanner captures a calibration image with respect to corresponding DUC during calibration, and the calibration image is inputted to the processor, which determines transformation mapping from the calibration image to the base image. The determined transformation is then transferred to the DUC during calibration.

DETAILED DESCRIPTION OF THE INVENTION

Figure 1:
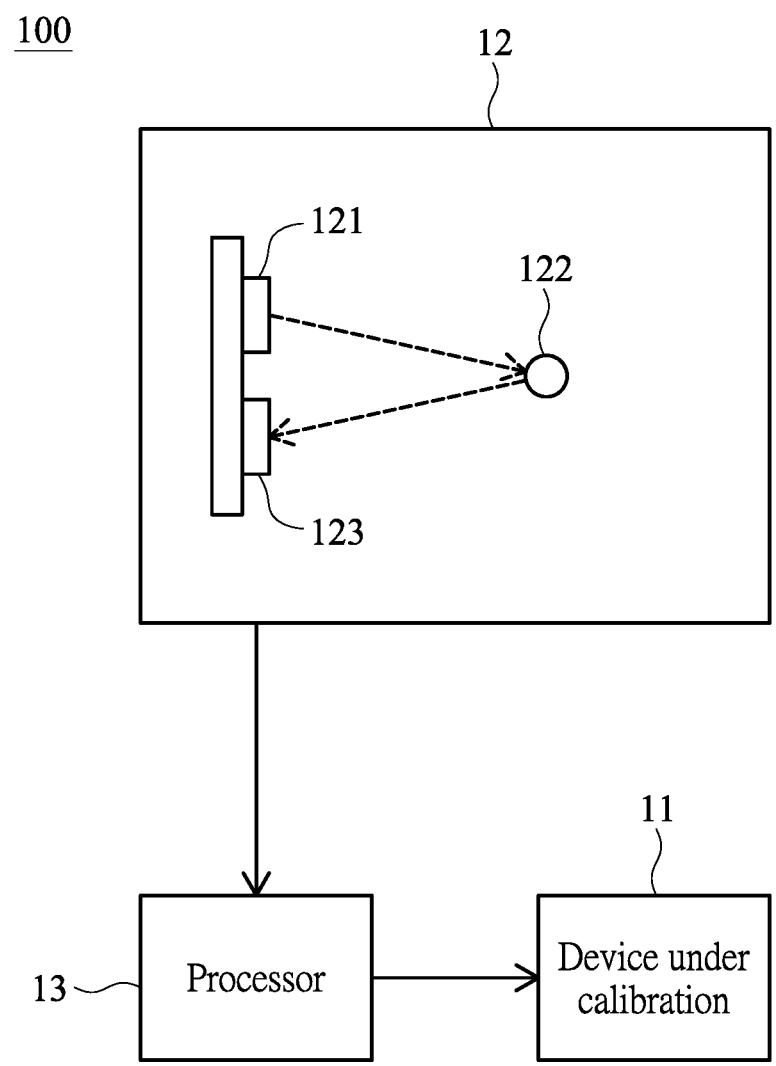
FIG. 1 shows a block diagram illustrating a system for calibrating a three-dimensional (3D) scanning device as a device under calibration (DUC) according to one embodiment of the present invention.
Figure 2:
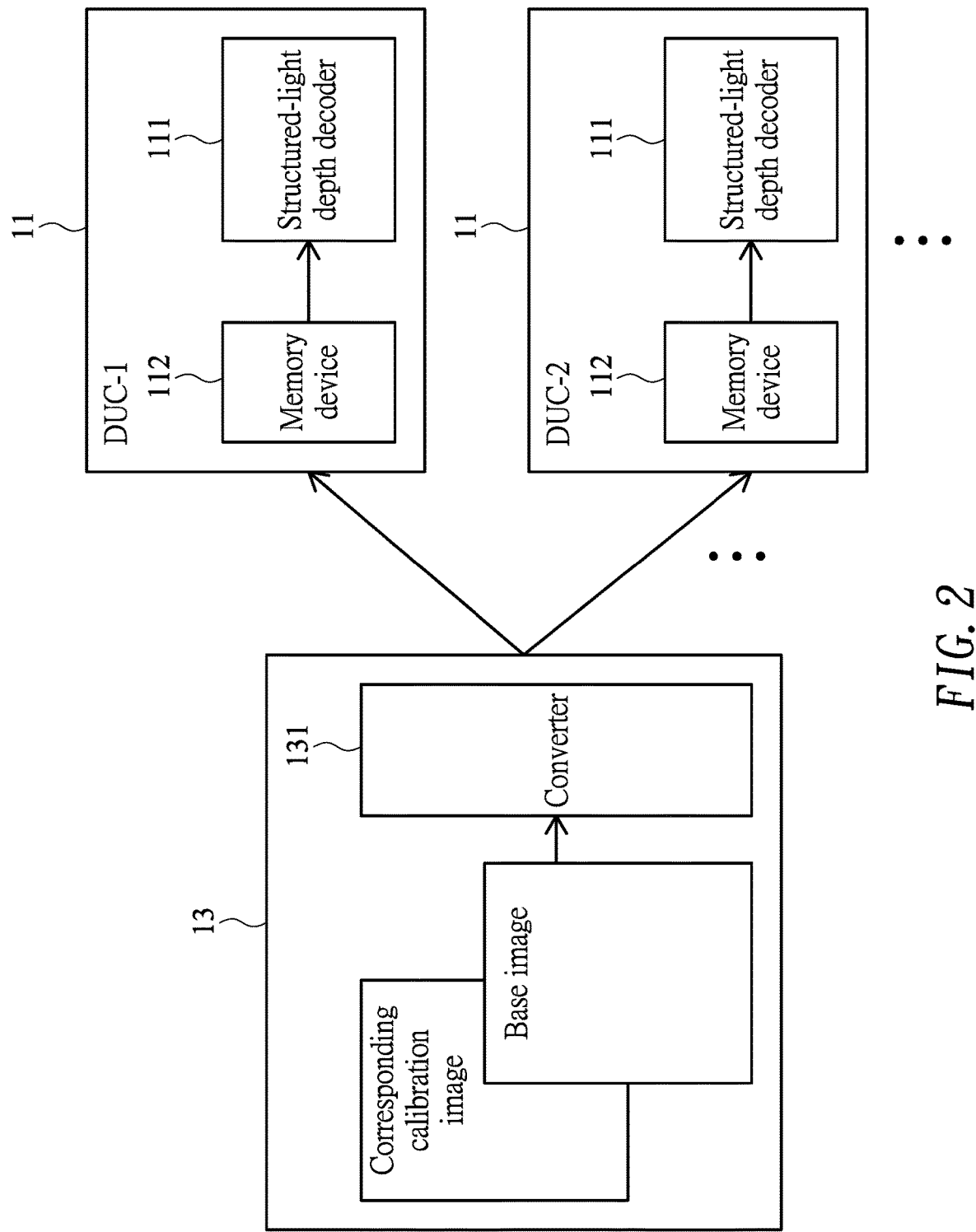
FIG. 2 shows a detailed block diagram illustrating the system for calibrating 3D scanning devices as DUCs in sequence.

FIG. 1 shows a block diagram illustrating a system 100 for calibrating a three-dimensional (3D) scanning device as a device under calibration (DUC) 11 according to one embodiment of the present invention, and FIG. 2 shows a detailed block diagram illustrating the system 100 for calibrating 3D scanning devices as DUCs 11 in sequence. The 3D scanning device may, for example, be embedded in a mobile device such as mobile phone.

In the embodiment, the system 100 may include a structured-light scanner 12 configured to capture a calibration image by performing a structured-light operation. Specifically, the structured-light scanner 12 may include a projector 121 configured to project a transmitted light with a calibration pattern (for example, dots) onto a calibration object 122. The transmitted light may be visible light or invisible light such as infrared light.

The structured-light scanner 12 may include an image capture device 123 (e.g., camera) configured to receive a reflected light (reflected from the calibration object 122), thereby generating the calibration image. The system 100 of the embodiment may include a processor 13 configured to perform calibrations on the DUCs 11 respectively.

Figures 3, 4:
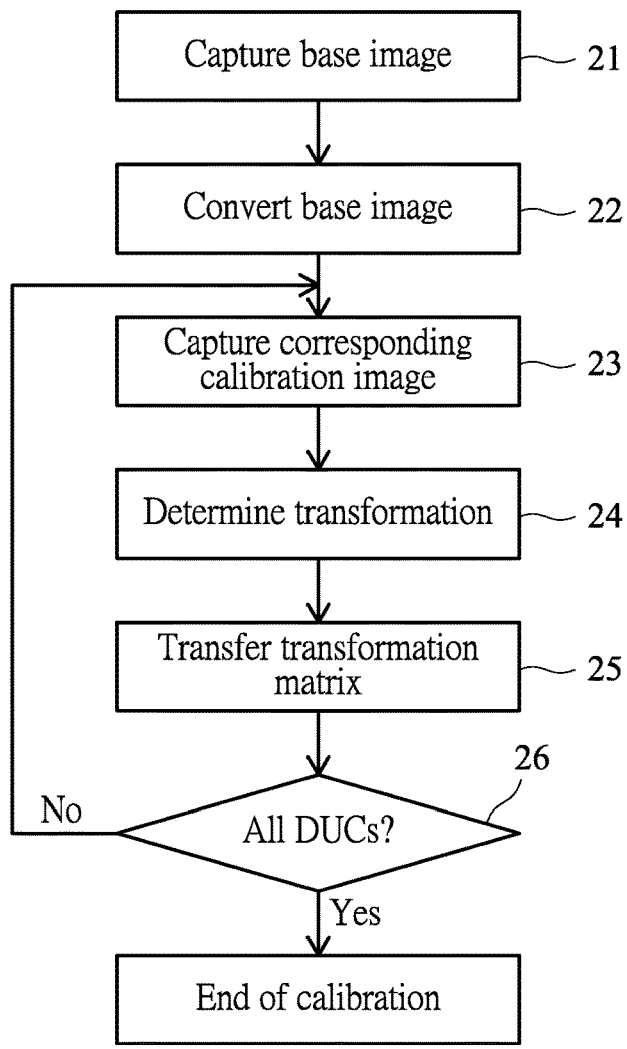
FIG. 3 shows a flow diagram illustrating a method for calibrating 3D scanning devices as DUCs according to one embodiment of the present invention.
FIG. 4 schematically shows transformation mapping from the calibration image to the base image.

FIG. 3 shows a flow diagram illustrating a method 200 for calibrating 3D scanning devices as DUCs 11 according to one embodiment of the present invention. Specifically, in step 21, the structured-light scanner 12 may capture a base image by performing a structured-light operation. It is noted that, the base image may be shared with all the DUCs 11. The structured-light operation in step 21 may be performed and the base image may be captured prior to calibration. The (pre-captured) base image may then be stored in the processor 13 and the DUCs 11 prior to calibration.

Next, in step 22, the base image may be optionally converted, if required, by a converter 131 (of the processor 13) into a data format compatible with, or suitable for, a structured-light depth decoder 111 of the DUC 11 (i.e., 3D scanning device). The converted base image may be stored in a memory device 112 of each DUC 11 prior to calibration. It is appreciated that, the conversion and the storage of the base image may be executed prior to calibration. In one embodiment, the memory device 112 may be embedded in the DUC 11. In another embodiment, the memory device 112 may be an external device that is outside but associated with the corresponding DUC 11.

Next, in step 23, while performing calibration, the structured-light scanner 12 may capture a calibration image with respect to corresponding DUC 11 (e.g., DUC-1 as exemplified in FIG. 2) by performing structured-light operation. The captured calibration image may then be inputted to the processor 13.

According to one aspect of the embodiment, the processor 13 may determine (linear) transformation mapping from the calibration image to the base image (step 24). FIG. 4 schematically shows transformation mapping from the calibration image to the base image. Specifically, a transformation matrix T is determined and used to map from the calibration image to the base image as follows:

$$\begin{bmatrix} x' \\ y' \\ w' \end{bmatrix} = T \begin{bmatrix} x \\ y \\ w \end{bmatrix} = \begin{bmatrix} a & b & c \\ d & e & f \\ g & h & i \end{bmatrix} \begin{bmatrix} x \\ y \\ w \end{bmatrix}$$

where x', y' and w' represent x-coordinate, y-coordinate and depth of the base image, and x, y and w represent x-coordinate, y-coordinate and depth of the calibration image.

Subsequently, in step 25, entries (or coefficients or elements) of the transformation matrix (e.g., a, b . . . i as exemplified in FIG. 4) associated with corresponding calibration image are then transferred to the corresponding DUC 11 and stored in the corresponding memory device 112, therefore finishing the calibration. Steps 22-25 may be repetitively performed with respect to each DUC 11 until all the DUCs 11 are exhausted (step 26).

(The entries of) the transformation matrix as stored in the corresponding DUC 11 may be utilized in other (following) operations (e.g., depth-related algorithm calculations) following the calibration. Specifically, in the depth-related algorithm calculation, the corresponding calibration image is first recovered based on the transformation matrix and the base image, and the recovered calibration image is then used as ground truth, based on which depth-related algorithm calculations may be executed by the corresponding structured-light depth decoder 111.

For the embodiment as described above, only the transformation matrix (with just nine entries) associated with corresponding calibration image is transferred to the corresponding DUC 11 during the calibration, thereby substantially reducing calibration time and cost. Quite the contrary, in the conventional calibration system, coordinates and depths of the entire calibration image should be transferred to the corresponding DUC during calibration, thereby consuming a lot of time and incurring high cost.

Although specific embodiments have been illustrated and described, it will be appreciated by those skilled in the art that various modifications may be made without departing from the scope of the present invention, which is intended to be limited solely by the appended claims.

What is claimed is:

1. A system for calibrating a three-dimensional scanning device, comprising:
   a structured-light scanner capable of performing a structured-light operation; and
   a processor that performs calibration on a device under calibration (DUC);
   wherein the structured-light scanner captures a base image by performing the structured-light operation prior to calibration;
   wherein the structured-light scanner captures a calibration image with respect to corresponding DUC during calibration, and the calibration image is inputted to the processor, which determines transformation mapping from the calibration image to the base image, the determined transformation being then transferred to the DUC during calibration.

2. The system of claim 1, wherein the structured-light scanner comprises:
   a projector that projects a transmitted light with a calibration pattern onto a calibration object; and
   an image capture device that receives a reflected light from the calibration object.

3. The system of claim 1, wherein the processor comprises a converter that converts the base image into a data format compatible with a structured-light depth decoder of the DUC prior to calibration.

4. The system of claim 1, wherein the DUC comprises a memory device configured to store the base image prior to calibration, and to store the determined transformation during calibration.

5. The system of claim 1, wherein the processor determines a transformation matrix used to map from the calibration image to the base image.

6. The system of claim 5, wherein entries of the transformation matrix are transferred to the DUC during calibration.

7. The system of claim 1, wherein only the determined transformation but not the calibration image is transferred to the DUC during calibration.

8. The system of claim 1, wherein the base image is stored in the processor and the DUC prior to calibration.

9. A method for calibrating a three-dimensional scanning device, comprising:
   providing a base image that is captured by performing structured-light operation prior to calibration, the base image being stored in a device under calibration (DUC) prior to calibration;
   capturing a calibration image with respect to a corresponding device under calibration (DUC) during calibration;
   determining transformation mapping from the calibration image to the base image during calibration; and
   transferring the determined transformation to the DUC during calibration.

10. The method of claim 9, wherein the structured-light operation comprises the following steps:
    projecting a transmitted light with a calibration pattern onto a calibration object; and
    receiving a reflected light from the calibration object.

11. The method of claim 9, further comprising:
    converting the base image into a data format compatible with the DUC prior to calibration.

12. The method of claim 9, wherein the DUC stores the base image prior to calibration, and stores the determined transformation during calibration.

13. The method of claim 9, wherein the transformation is determined by the following step:
    determining a transformation matrix used to map from the calibration image to the base image.

14. The method of claim 13, wherein entries of the transformation matrix are transferred to the DUC during calibration.

15. The method of claim 9, wherein only the determined transformation but not the calibration image is transferred to the DUC during calibration.

* * * * *